US011026406B2

(12) United States Patent
Planquette

(10) Patent No.: US 11,026,406 B2
(45) Date of Patent: Jun. 8, 2021

(54) MOBILE ROBOT, IN PARTICULAR AN EDUCATION ROBOT, FOR POULTRY FARM AND REARING FACILITY IMPLEMENTING ONE OR MORE ROBOTS

(71) Applicant: TIBOT, Cesson-Sevigne (FR)

(72) Inventor: Lionel Planquette, Guichen (FR)

(73) Assignee: TIBOT, Cesson-Sevigne (FR)

( * ) Notice: Subject to any disclaimer, the term of this patent is extended or adjusted under 35 U.S.C. 154(b) by 368 days.

(21) Appl. No.: 16/063,032

(22) PCT Filed: Dec. 15, 2016

(86) PCT No.: PCT/EP2016/081273
§ 371 (c)(1),
(2) Date: Jun. 15, 2018

(87) PCT Pub. No.: WO2017/102995
PCT Pub. Date: Jun. 22, 2017

(65) Prior Publication Data
US 2018/0360002 A1      Dec. 20, 2018

(30) Foreign Application Priority Data

Dec. 15, 2015    (FR) ..................................... 1562425

(51) Int. Cl.
*G06F 7/00*           (2006.01)
*A01K 45/00*        (2006.01)
(Continued)

(52) U.S. Cl.
CPC ............ *A01K 45/00* (2013.01); *A01K 1/0029* (2013.01); *A01K 1/0128* (2013.01); *A01K 15/02* (2013.01);
(Continued)

(58) Field of Classification Search
CPC ...... A01K 45/00; A01K 31/165; A01K 29/00; A01K 1/0128; A01K 1/0029; A01K 15/02;
(Continued)

(56) References Cited

U.S. PATENT DOCUMENTS

| 4,304,194 | A | 12/1981 | Boykin, II et al. |
| 6,439,162 | B1 | 8/2002 | van den Berg |

(Continued)

FOREIGN PATENT DOCUMENTS

| WO | 2014141313 A2 | 9/2014 | |
| WO | WO-2014141313 A2 * | 9/2014 | ........... A01K 29/005 |
| WO | 2015105776 A1 | 7/2015 | |

OTHER PUBLICATIONS

English translation of the Russian Office Action dated Apr. 20, 2020, for corresponding RU Application No. 2018125793/10 (040790), filed Dec. 15, 2016.
(Continued)

*Primary Examiner* — Yolanda R Cumbess
(74) *Attorney, Agent, or Firm* — David D. Brush; Westman, Champlin & Koehler, P.A.

(57) ABSTRACT

A mobile education robot for a poultry farm having at least one laying area. The robot is configured to move the robot on the ground, prompt movement of at least two different types in order to push the birds present on the ground towards the at least one laying area, and to control the movement prompting. The robot includes mechanical elements for levelling and aerating the ground.

16 Claims, 8 Drawing Sheets

(51) Int. Cl.
| | |
|---|---|
| *A01K 31/04* | (2006.01) |
| *A01K 31/16* | (2006.01) |
| *A01K 29/00* | (2006.01) |
| *A01K 1/01* | (2006.01) |
| *A01K 1/00* | (2006.01) |
| *A01K 15/02* | (2006.01) |
| *A01K 31/22* | (2006.01) |
| *A01M 29/10* | (2011.01) |
| *A01M 29/16* | (2011.01) |
| *A01M 29/26* | (2011.01) |
| *A01M 29/32* | (2011.01) |
| *G05D 1/00* | (2006.01) |
| *G05D 1/02* | (2020.01) |

(52) U.S. Cl.
CPC ............ *A01K 29/00* (2013.01); *A01K 31/04* (2013.01); *A01K 31/165* (2013.01); *A01K 31/22* (2013.01); *A01M 29/10* (2013.01); *A01M 29/16* (2013.01); *A01M 29/26* (2013.01); *A01M 29/32* (2013.01); *G05D 1/0088* (2013.01); *G05D 1/027* (2013.01); *G05D 1/0278* (2013.01); *Y10S 901/01* (2013.01)

(58) Field of Classification Search
CPC ...... A01K 31/22; A01K 31/04; A01K 15/029; A01K 31/16; A01M 29/10; A01M 29/16; A01M 29/26; A01M 29/32; G05D 1/0088; G05D 1/027; G05D 1/0278; Y10S 901/01
See application file for complete search history.

(56) References Cited

U.S. PATENT DOCUMENTS

| | | | |
|---|---|---|---|
| 2005/0217589 A1* | 10/2005 | Daniel ................ | A01K 1/0029 119/51.02 |
| 2008/0203178 A1 | 8/2008 | Barrett et al. | |
| 2015/0250137 A1* | 9/2015 | Palsgaard ................ | B60P 1/00 119/57.92 |
| 2017/0006837 A1* | 1/2017 | Balzani ................ | G01B 11/002 |

OTHER PUBLICATIONS

International Search Report dated Mar. 23, 2017, for corresponding International Application No. PCT/EP2016/081273, filed Dec. 15, 2016.
Written Opinion dated Mar. 23, 2017, for corresponding International Application No. PCT/EP2016/081273, filed Dec. 15, 2016.
Englsh translation of the International Written Opinion dated Mar. 31, 2017, for corresponding International Application No. PCT/EP2016/081273, filed Dec. 15, 2016.
English translation of the French Search Report and Written Opinion dated Jul. 28, 2016 for corresponding French Application No. 1562425.

* cited by examiner

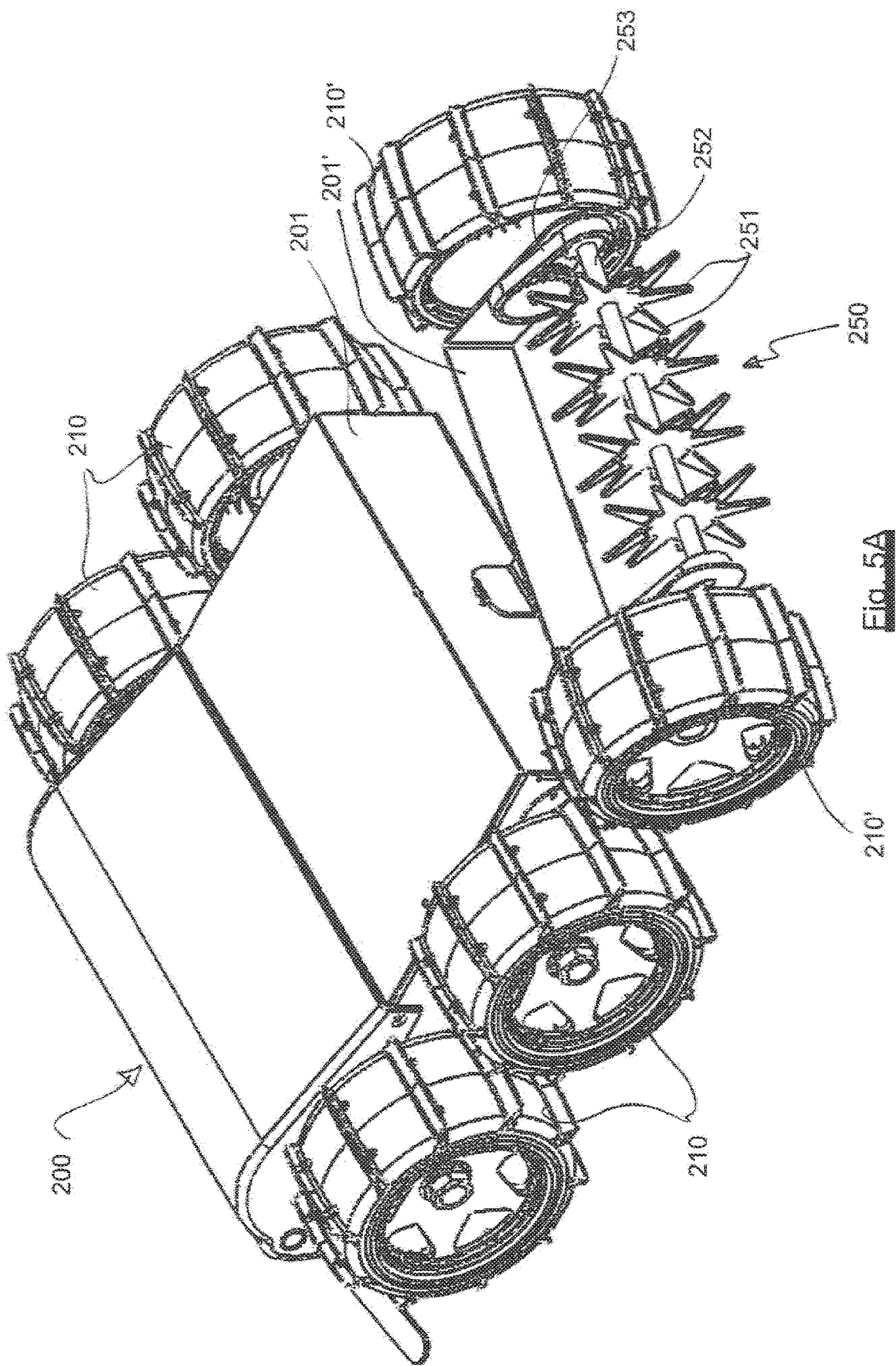

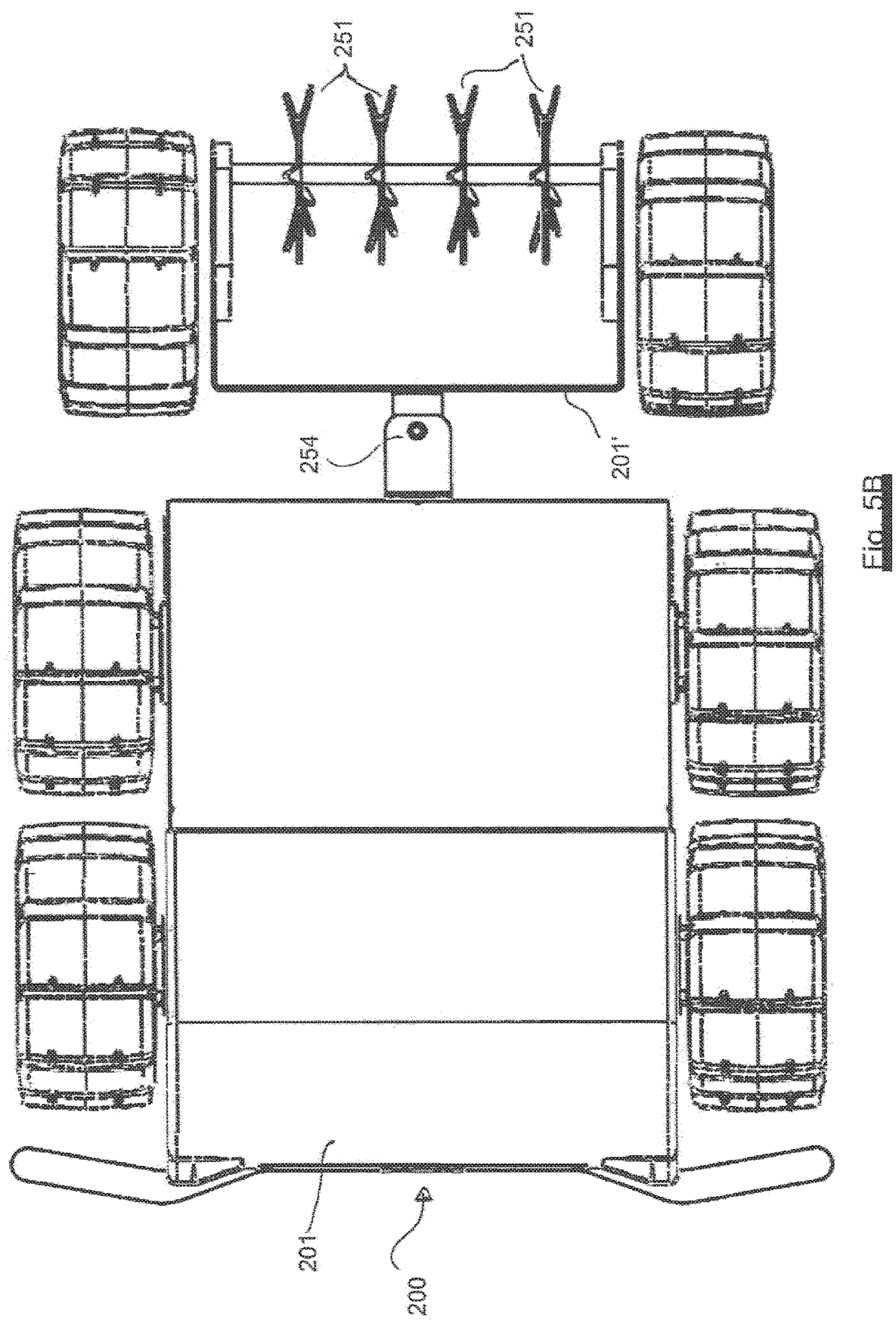

MOBILE ROBOT, IN PARTICULAR AN EDUCATION ROBOT, FOR POULTRY FARM AND REARING FACILITY IMPLEMENTING ONE OR MORE ROBOTS

CROSS-REFERENCE TO RELATED APPLICATIONS

This Application is a Section 371 National Stage Application of International Application No. PCT/EP2016/081273, filed Dec. 15, 2016, the content of which is incorporated herein by reference in its entirety, and published as WO 2017/102995 on Jun. 22, 2017, not in English.

FIELD OF THE INVENTION

The field of the invention is that of poultry farming.

More specifically, the invention relates to a mobile robot for poultry farms designed to prevent or at least minimize floor egg-laying and improve the fertility of the birds of a poultry-rearing farm.

The invention also relates to poultry-rearing facility that implements one or more of these robots.

PRIOR ART

Poultry houses generally comprise a living space provided with drinking troughs and food troughs, and a laying area with laying nests, the number of which depends on the number of laying hens in the batch to be raised in the building.

Egg production starts with a nest learning phase after the poultry birds have been transferred into the building and continues for several weeks. During this critical period, the poultry birds must learn to lay eggs only in the nests which they must consider to be the area most suited for this purpose in the building.

However, certain birds choose to go and lay eggs in other places in the building, on the floor or on grates, such as beneath the food troughs and the drinking troughs, or else along the walls.

Eggs laid outside the nests, on the floor, are dirty in appearance and have to be cleaned by hand, and are more subject to bacterial contamination. These floor eggs cannot be incubated and therefore must in certain cases be eliminated for reasons of health risk (when the use of antibiotics to prevent infection in one-day hatchlings is prohibited) or they must be downgraded.

During this learning phase, to prevent floor laying, it is common practice to reduce the thickness of the litter on the floor.

The poultry farmer must, in addition, move among the birds regularly in order to lightly intrude upon them and lead them towards the laying nests.

The reduction of the percentage of floor egg-laying, especially during the learning period of the poultry birds, depends a great deal on the quality and frequency of action by the poultry farmer, who spend several hours a day educating or teaching the birds of his poultry farm. Regular passages by the farmer are also aimed at forcing those birds that are hiding or stagnating in the same place to move about so as to stimulate them and improve their fertility.

This causes extra work for the farmer who not only travels on foot through all the buildings of his farm in order to agitate the birds, but also has to collect the floor eggs since the poultry birds tend to lay their eggs at places where there is already an egg in place.

The heat prevailing in the farm buildings, as also the presence of ammonia, dust and noise, can give rise to health problems among poultry farmers.

In short, floor egg-laying has harmful consequences: it reduces the number of eggs that meet quality criteria, it entails repetitive and tedious work on the part of the farmer, it encourages other birds to lay eggs on the floor, it causes a loss of productivity and profitability for all the actors in the sector (the sector currently lacks hatching eggs (HE).

Despite frequent passages by poultry farmers in the buildings in order to move the poultry birds, these birds tend to get habituated to the presence of the farmers.

Thus, current techniques aimed at teaching birds to lay eggs only in nests and improve their fertility are not entirely satisfactory.

SUMMARY OF THE INVENTION

The invention does not pose these problems related to prior-art techniques for educating birds to lay eggs in nests.

Indeed, the invention relates to a mobile teaching robot for a poultry farm comprising at least one egg-laying area, the robot comprising means for moving itself on the floor. According to the invention, such a robot furthermore comprises:

means of at least two distinct types for encouraging mobility in order to force the poultry birds present on the floor to move towards at least one egg-laying area;
  means for controlling said mobility-encouraging means; and
  mechanical means for leveling and ventilating the floor.

Thus, the invention proposes an education or teaching robot that is particularly useful in the nest-learning phase to teach the birds to lay eggs in nests and not on the floor. Such a robot reduces the tediousness of the poultry farmer's work.

The implementing of different types of mobility encouragement prevents the birds from getting habituated to the presence of the robot and its mobility-encouraging means.

The implementing of maintenance means (ventilation) and floor leveling means prevents the formation of uneven features called 'shelters' that are preferred by the poultry birds for laying their eggs. In addition, it reduces the tediousness of the poultry farmer's work. Finally, the regular ventilation of the floor limits its humidity level, which can be the cause of illnesses (for example foot dermatitis among pullets).

These mechanical maintenance (ventilation) and floor leveling means are intended for contact with the floor and take the form of aligned teeth (harrows) or rotationally mobile toothed wheels.

In one mode of implementation, the mobile robot follows a pre-defined path on the entire territory of the poultry farm with which it is associated. This makes sure that the robot truly moves throughout this entire territory and that all the poultry birds in this territory are educated.

This movement is defined so that the mobile robot encourages the poultry birds to move towards the egg-laying area.

According to one particular aspect of the invention, the mobile robot comprises a module for collecting floor eggs.

Advantageously, such a module for collecting floor eggs comprises:

a plurality of coaxially disposed disks for grasping floor eggs, elements for guiding the eggs towards the grasping disks,
  an egg storage box having a inclined bottom wall,
  between two adjacent grasping disks, at least one finger for extracting an egg situated between the two grasping disks towards said storage box, and between two adjacent grasping disks, at least one finger for retaining an egg between two grasping disks.

In one embodiment, the disks are motor driven and designed to be situated at a distance from the floor.

In one alternative embodiment, the disks are in contact with the floor and are driven rotationally by the movement of the robot.

Such a module for collecting floor eggs firstly enables the robot to gain in versatility and secondly reduces the tediousness of the work for the poultry farmers.

This particular layout of the module ensures the collection of the eggs while ensuring their structural integrity.

According to one particular aspect of the invention, such means for encouraging mobility are chosen from among:
- at least one sound source;
- at least one light source;
- at least one mechanical mobile element;
- at least one electrical discharging device.

Such mobility-encouraging means are stimuli of different types that are simple to implement and low cost.

The mobile mechanical element can be an articulated arm, a flag moved by shaking means, a rotating disk or any other mobile mechanical device used to teach the poultry. The electrical discharge device enables low-intensity electrical discharges to be delivered by contact with a poultry bird.

The robot can thus implement one or more fixed or flashing light sources (of the LED type for example) with changing colors and frequencies. In one variant, a combination of light sources of different colors can be implemented. Only one or more of the mobility-encouraging means can be activated at a time.

Preferably, the successive sequences for activating the mobility-encouraging means are not identical, so as to prevent the birds from getting habituated to the presence of the robot.

Depending on the degree of habituation on the part of the poultry birds, it can be the case that these mobility-encouraging means will no longer be activated for periods of variable length (especially at the end of the learning period). The robots can however be used to fulfill the secondary functions described here below.

According to one particular aspect of the invention, the control means is configured to activate mobility-encouraging means of at least two distinct types, one after the other or simultaneously.

According to one particular aspect of the invention, the robot comprises a means for the geolocation of the robot.

These means for the geolocation of the robot are used to determine the precise position of the robot within a living area and make sure that the path of the robot complies with the programmed theoretical path as precisely as possible.

According to one particular aspect of the invention, the robot comprises sensors for measuring environmental parameters of the poultry farm, including the poultry house when the poultry birds are raised indoors.

These sensors enable a mapping of the environmental parameters throughout the poultry house.

To this end, the robot comprises processing means capable of delivering a mapping of the environmental parameters of the poultry farm as a function of the environmental parameters measured.

Particularly, the environmental parameters measured are chosen from among:
- the ambient temperature;
- the pressure;
- the humidity;
- the carbon dioxide level;
- the ammonia level.

The poultry houses, in the case of indoor poultry farming, must meet these environmental criteria on ammonia or carbon dioxide rates, humidity, ambient temperature and pressure. The measurement of these parameters by the robot enables the detection of an abnormal situation requiring intervention by a human being.

The implementation of these sensors of environmental parameters seek to improve the well-being of the animal and save natural resources, in the context of an improvement of the litters, such as savings on woodchips, gas etc., by ventilating these litters but also by temperature and humidity measurements.

According to one particular aspect of the invention, such a robot comprises sensors for measuring the physiological parameters of the poultry birds.

Particularly, the robot comprises a sensor for measuring body temperature.

The robot according to the invention can thus perform contactless measurement of the poultry bird's body temperature.

The implementing of this type of sensor improves the animal's well-being.

According to one particular aspect of the invention, such a robot comprises sensors for acquiring visual and/or sound information.

It can be a photo camera, a video camera or a microphone.

According to one particular aspect of the invention, such a robot comprises means for processing the parameters measured and/or the visual and/or sound information acquired capable of delivering a mapping of the dead birds and/or floor eggs.

These processing means implement a mapping software program used to illustrate the position of the dead birds and of the floor eggs in a graphic representation of the poultry farm.

Such software can, if necessary, provide statistical data on these aspects.

According to one particular aspect of the invention, such a robot comprises wireless communications means capable of transmitting the parameters measured and/or the visual information acquired and/or the sound information acquired to a remote site.

The mapping of dead birds and floor eggs present as well as the statistical data can be transmitted by the robot to a remote site.

According to one particular aspect of the invention, such a robot comprises means for determining an anomaly among the parameters measured, the visual information acquired and the sound information acquired, and means for generating an alarm that is to be transmitted to a remote site through communications means.

Such an alarm can be transmitted to the poultry farmer or again to a veterinary doctor. The invention also relates to a poultry farming facility comprising at least one robot as described here above.

LIST OF FIGURES

Other features and advantages of the invention shall appear more clearly from the following description of a preferred embodiment of the invention, given purely by way of an illustrator and non-exhaustive example, and from the appended drawings of which:

FIGS. 5A and 5B are views in perspective and top views of a mobile robot according to a first embodiment of the invention implementing mechanical means of a first type for leveling and ventilating the floor;

DETAILED DESCRIPTION OF THE INVENTION

Reminder of the Principle of the Invention

The general principle of the invention is based on an independent, mobile robot that is configured to "educate" or teach the poultry birds in a poultry farm to lay eggs in nests and to make them move about.

This robot comprises several types of means to encourage mobility in such a way as to minimize floor egg-laying or at least minimize the phenomenon of habituation on the part of the poultry birds to the presence of the robot, including during the nest-learning period.

The teaching of the poultry birds by the robot furthermore stimulates birds that are sitting still and optimizes their fertility.

This robot furthermore includes mechanical means, such as a rake or harrow, for leveling and ventilating the floor covered with litter (wood shavings, straw etc.)

Such mechanical means prevent the formation of shelter areas that encourage floor egg-laying. They also reduce work stress for poultry farmers and limit the level of floor humidity which can be a source of illness (for example foot dermatitis in the pullet).

The use of a litter-ventilating tool increases the period of use and therefore limits its renewal (having an economic impact).

This robot can include a device for collecting floor eggs.

Detailed Description of One Embodiment

Figure 1:
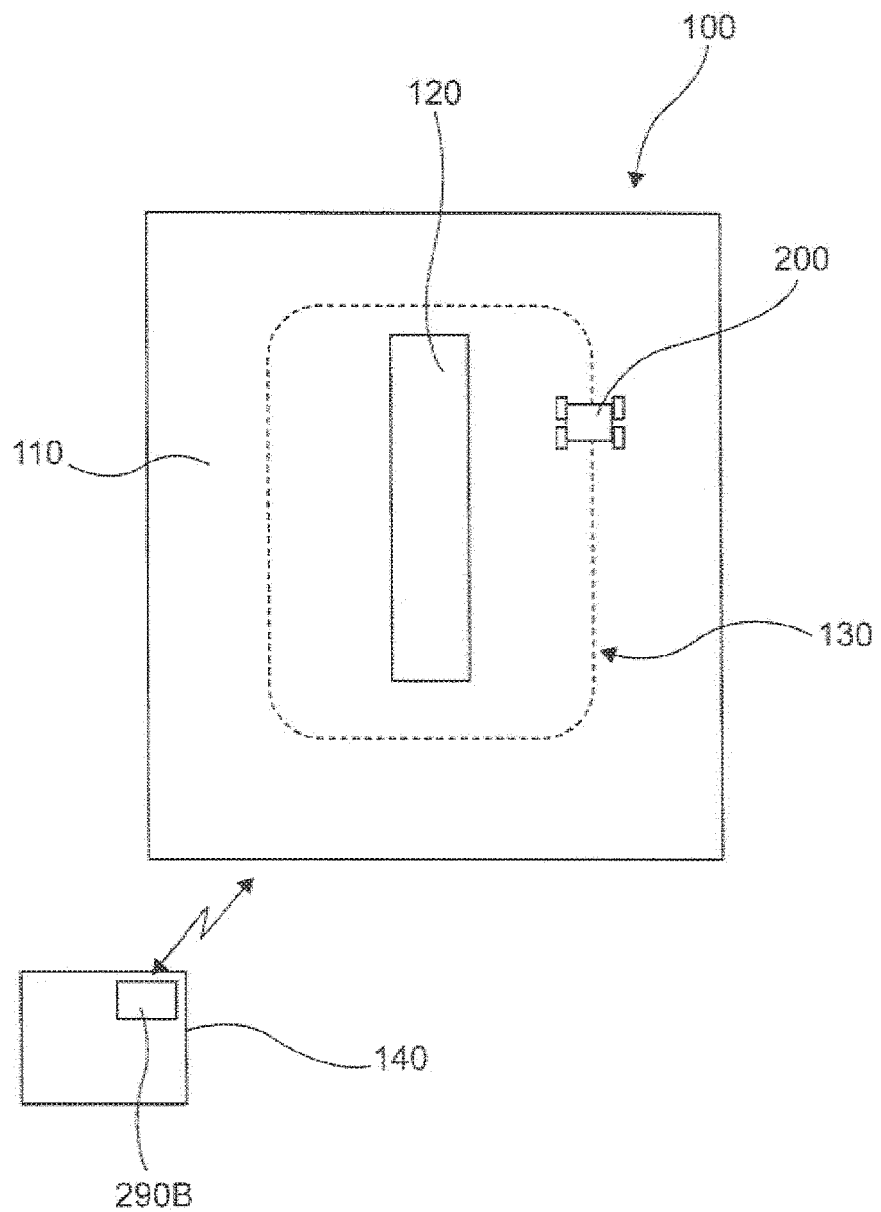
FIG. 1 is a schematic top view of a poultry house in which there is implemented a mobile robot according to the invention.

FIG. 1 is a schematic top view of a poultry house 100 for a batch of egg-laying poultry. The poultry house 100 comprises a sanitary pass-through area (not shown), a living area 110 in which there are disposed bird perches, drinking troughs and food troughs and an egg-laying area 120 comprising a number of laying nests depending on the number of pullets in the poultry farm. The eggs can be collected by hand or by means of a conveyor belt or other conveyor (not shown).

A robot 200 according to the invention can move about in the living area 110 in order to prevent floor egg-laying by teaching or educating the poultry birds. Several robots can be provided in the living area 110.

A schematic view is presented of one path 130, among several possible paths taken by the robot 200 when it is put into motion.

The robot 200 carries wireless communications means 290A (FIG. 2) comprising data transmission means and data reception means.

FIG. 1 also shows a room 140 that is situated at a distance from the poultry farm 100. It can be an annex to the poultry house 100, or else a poultry farmer's or veterinary doctor's workplace or living area that is relatively distant from the poultry house 100.

The room 140 is equipped with communications means 290B (a laptop, a mobile telephone or a touchpad, for example) intended for communication with the robot 200, as shall be described in greater detail here below. The communications means 290B comprise data transmission means and data reception means. Data can thus be exchanged between the communications means 290A and 290B through a WiFi (registered mark), Bluetooth (registered mark), SIGFOX (registered mark) or LoRa (registered mark) link or by radio-electrical waves.

Figure 2:
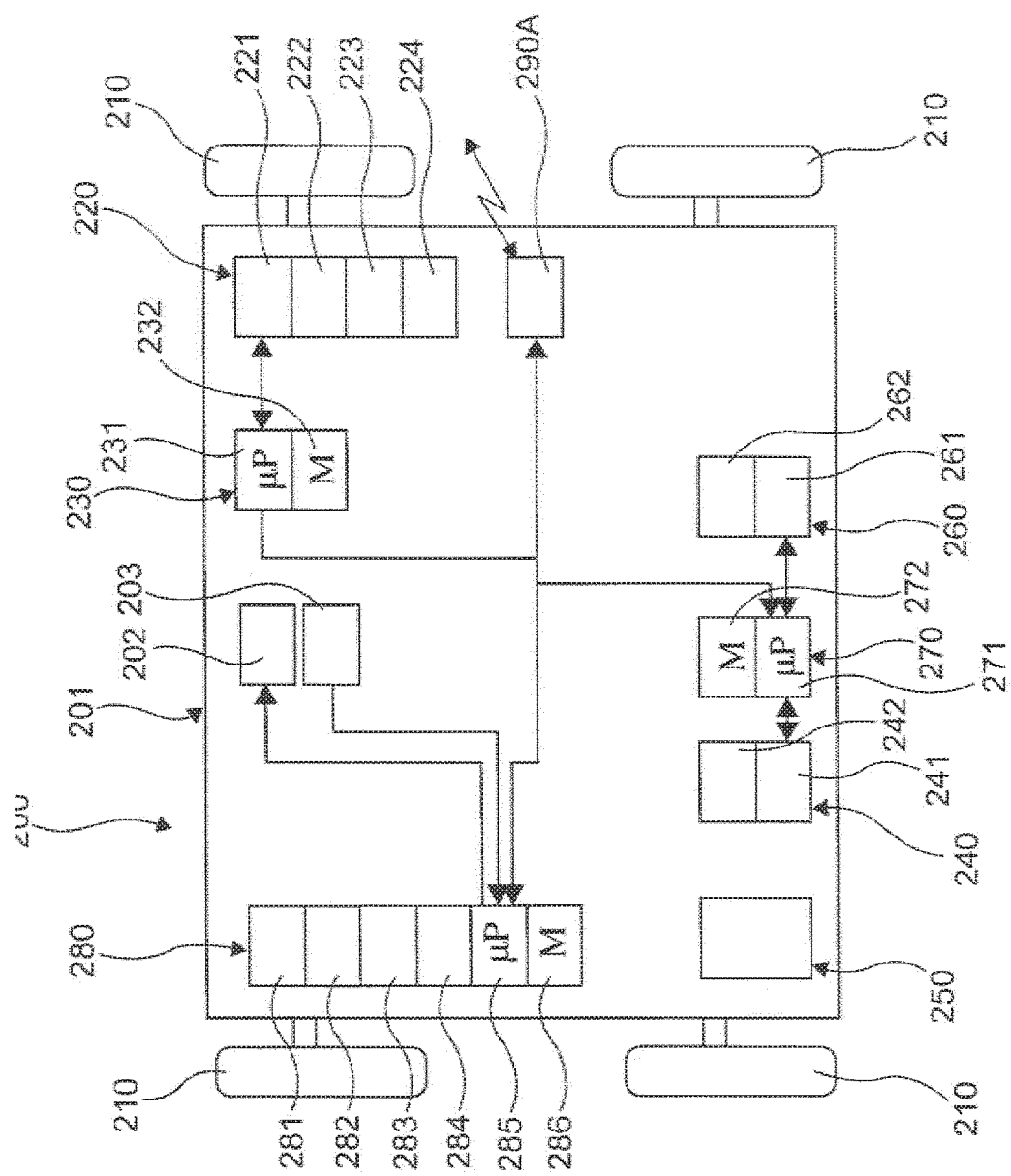
FIG. 2 is a schematic representation of a mobile robot according to the invention.

FIG. 2 is a schematic representation of a robot 200 according to the invention that can move about on the floor of the living area 110 of the poultry house 100.

The robot 200 comprises a chassis 201 with wheels, namely two front wheels 210 and two rear wheels 210, mounted on the sides of the chassis 201, a drive motor 202 for the wheels 210, and an energy source 203 in the form of one or more electric batteries The robot can be equipped with three wheels or more. Other means of movement such as tracks or articulated legs, and other energy sources can be implemented.

Movement of the Robot

In the example illustrated in FIG. 1, the robot 200 is programmed to follow a predetermined path 130 using guidance and navigation means 280 comprising:
  one or more inertial sensors 281, such as accelerometers, gyrometers, etc., a magnetometer 282, and geolocation means 284, by radiofrequency, laser or satellite (GPS),
  one or more ultrasound, optical or infrared sensors 283 for detecting a fixed obstacle, such as a bucket or dead hen, or a moving, such as a hen,
  a first microprocessor 285 connected to the wheel driving motor, and
  a first memory unit 286 connected to the first microprocessor 285.
  The guidance and navigation means 280 drive the movement of the wheels 210 of the robot 200 on the basis of the signals coming from the sensors 281 to 284.

When an obstacle is detected by the ultrasound sensors 283, the guidance and navigation means 280 steer the movement of the wheels 210 of the robot 200 so as to circumvent the obstacle, such as performing an avoidance maneuver.

Once the obstacle has been circumvented, the robot 200 continues its journey along the path 130.

Mobility-Encouraging Function

To efficiently encourage the mobility of the poultry birds within their living area 110, the robot 200 implements several types of mobility-encouraging means 220 that are activated by the control means 230. These control means 230 comprise a second microprocessor 231 that is capable of delivering control signals to the respective actuators of the mobility-encouraging means 221 to 224.

In the example illustrated, these mobility-encouraging means 220 comprise at least one sound source 221, at least one light source 222, at least one mobile mechanical element, such as an articulated mechanical arm 223, and at least one low-intensity electrical discharge device 224.

These mobility-encouraging means 221 to 224 deliver stimuli of different types, such as sound, light, mechanical and electrical stimuli, respectively.

The control means 230 are configured to activate or deactivate each of the mobility-encouraging means 221 to 224 and, to control the parameters, such as intensity, frequency, etc., of the stimuli delivered.

The control means 230 make it possible to control the movements of the articulated mechanical arm 223, such as the speed and the position.

Other types of mobility-encouraging means can be implemented without in any way departing from the framework of the invention.

For example, the unattached extremity of the articulated, mechanical arm 223 can be equipped with a sound-emitting and/or light-emitting device in order to be able to most efficiently orient the direction of transmission of the stimuli relative to the poultry birds that come before the robot 200.

In order to prevent the phenomenon of habituation of the poultry birds to the presence of the robot 200, and more precisely to the stimuli from the mobility-encouraging means 220 borne by the robot 200, the control means 230 can be programmed to actuate the mobility-encouraging means 220 in varied sequences, at variable intensities and frequencies in a predetermined, random or pseudo-random manner throughout the movement of the robot 200 along the path 130. The sequences may be performed one after the other, combined or not combined, periodically or not periodically. One or more programs can be stored in a storage memory 232.

Several, differently colored light sources can be planned.

It is possible to plan a sequence for activation of the mobility-encouraging means 220 that is repeated throughout the movement of the robot 200.

Moreover, the mobility-encouraging means 220 can be planned to be activated only when the robot 200 detects the presence of one or more poultry birds in a predetermined perimeter about the robot 200 based on visual information. This visual information may be collected by the acquisition module 260, for example.

The programmable aspect of the control means 230 offers a certain degree of flexibility in the control of the mobility-encouraging means 220. Depending on the results obtained (percentage of floor egg-laying, fertility of the poultry birds, reaction of the poultry birds to stimuli), a human subject can reprogram the robot 200 to modify the sequences for activating the mobility-encouraging means 220.

This reprogramming can be done remotely using communications means 290B of the room 140. This communications means 290B of the room is capable of communicating with the communications means 290A of the robot 200.

It is preferable for the mobility-encouraging means 220 to be disposed in the front and/or on top of the robot 200.

Egg-Collecting Function

In another embodiment, the robot 200 also comprises a module 300 for collecting floor eggs.

For reasons of clarity, the egg-collecting module 300 is represented independently of the robot 200. However, it will be understood that the egg-collecting module 300 is fixedly attached to the chassis of the robot 200. Alternatively, the egg-collecting module 300 may be detachably attached to the chassis of the robot 200, through reversible clip-on means.

Figure 3:
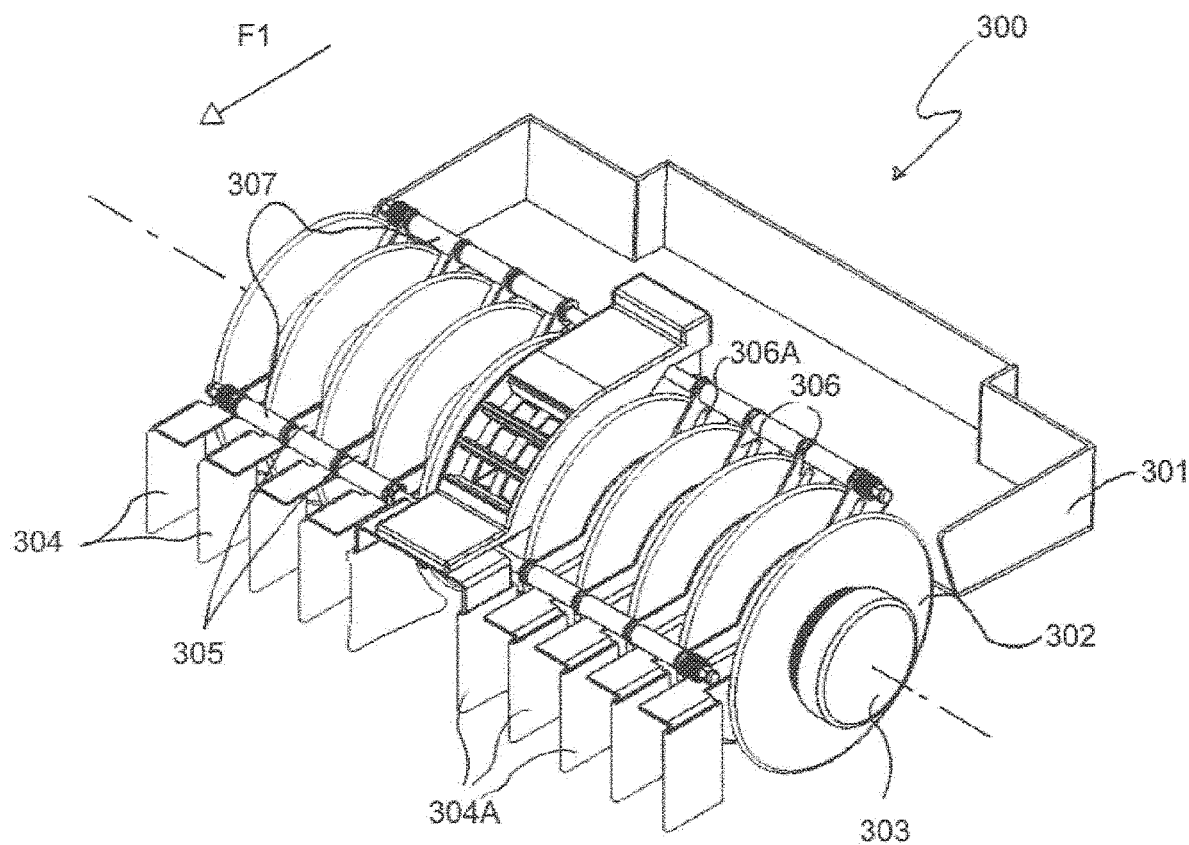
FIG. 3 is a view in perspective (or a three-quarter view) of a module of a robot according to the invention, for collecting floor eggs.

As illustrated in FIG. 3, the egg-collecting module 300 comprises an egg storage box 301. In this example, the egg storage box 301 is situated in the rear of the egg-collecting module 300, the eggs located on the floor being directed towards the egg-storage box 301 through the means for collecting floor eggs.

These means comprise a shaft 303 on which there are laid out egg-grasping disks 302. The disks 302 are coaxial and spaced out relative to one another. The width of the successive spaces between the grasping disks 302 is determined as a function of the size of the eggs. The eggs situated on the floor are therefore directed in a space situated between two adjacent grasping disks 302. The eggs are held and then lifted from the floor by the mutually facing surfaces of these two grasping disks 302 to be directed into the storage box 301.

Each space between two adjacent grasping disks 302 comprises extraction fingers 306 that are extended and inclined relative to the vertical. The inclined extraction fingers 306 enable the removal of the eggs that are "clamped" between two grasping disks 302, towards the storage box 301. Each space between two adjacent grasping disks 302 also comprises retaining fingers 305 that are extended horizontally. The retaining fingers 305 enable to block the downward movement of the eggs when the robot 200 moves backwards, so that the eggs do not rotate with the grasping disks 302 and fall back to the floor.

In this example, since the storage box 301 is situated behind the egg-collecting module 300, the extraction fingers 306 are also situated between the grasping disks 302 and the storage box 301.

The extraction fingers 306 and the retaining fingers 305 are mounted on horizontal shafts and are spaced by spacers 307.

The egg-collecting module 300 furthermore comprises a plurality of egg-guiding means 304 taking the form of vertical plates disposed in the extension of the surface of the grasping disks 302.

Thus, each guiding means 304 is aligned with a grasping disk 302 so as to orient the eggs on the floor towards the spaces situated between the grasping disks 302 and prevent these disks from running over the eggs.

All or part of each guiding means 304 is covered with a layer 304A of flexible material capable of absorbing shocks when the guiding means 304 come into contact with an egg.

Figure 4:
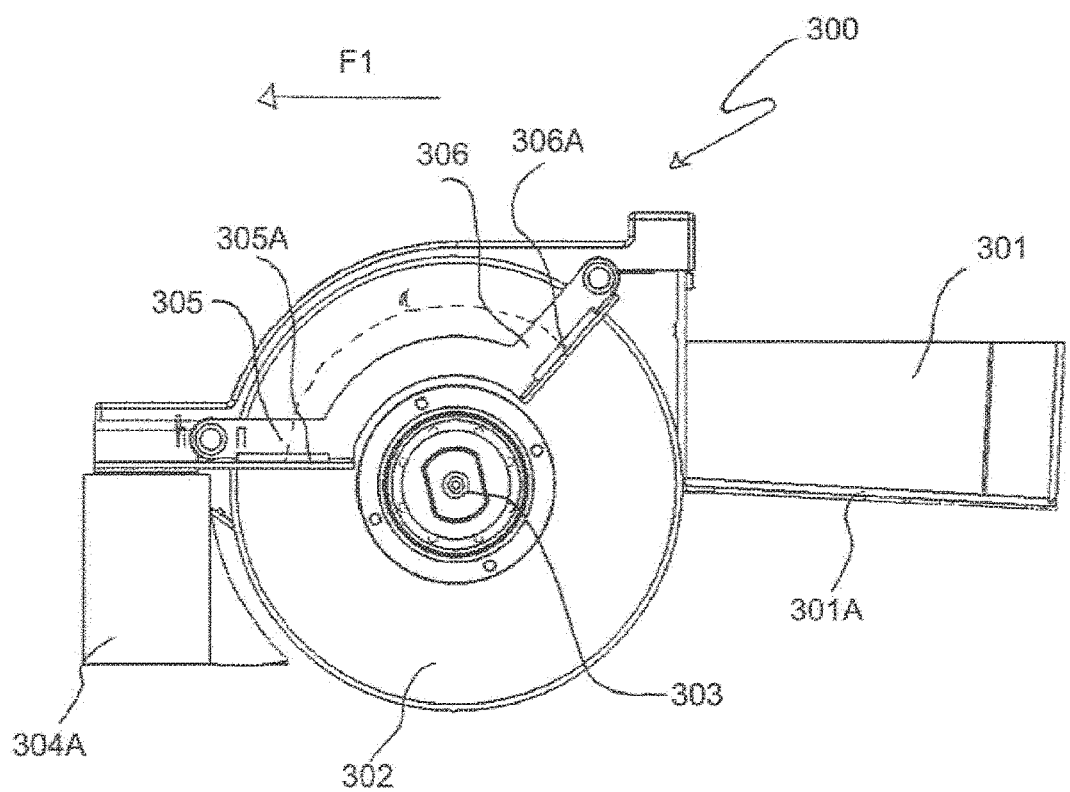
FIG. 4 is a view in profile of the module for collecting floor eggs of FIG. 3.

As illustrated in FIG. 4, the bottom wall 301A of the storage wall 301 is inclined.

This particular shape makes it possible, in a first stage, to move the eggs in a rolling motion towards the bottom of the storage box 301 and, in a second stage, to minimize their freedom of movement when the robot moves.

As can be seen in FIG. 4, the extraction fingers 306 and retaining fingers 305 each comprise protection elements 305A, 306A, at least on the surface potentially in contact with the eggs.

Such protection elements 305A, 306A enable the shocks to be absorbed and thus ensure the structural integrity of the eggs when they come into contact with the extraction fingers 306 or retaining fingers 305.

In addition, for each space defined between two adjacent grasping disks 302, the extracting finger 306 and the retaining finger 305 are spaced by an angle α of a value ranging from 120° to 150°, preferably around 135°.

The working of the egg-collecting module 300 is described here below with reference to FIGS. 3 and 4.

When the robot 200 moves forward, in the direction of the arrow F1, the grasping disks 302 are driven in rotation in the counter-clockwise sense, either by a motor-driven element, where the grasping disks 302 are not in contact with the floor, or by a link set up between the grasping disks 302 and the floor, where the grasping disks 302 are not motor-driven but are driven in rotation by the movement of the robot.

Preferably, the grasping disks 302 are mechanically attached to each other in rotation, at least in pairs.

When the egg-collecting module 300 comes into contact with an egg, if this egg is not centered relative to the space formed between the two adjacent grasping disks 302, it comes into contact with a guiding element 304 that directs it towards a space situated between two grasping disks 302.

Then, the egg comes into contact with two adjacent grasping disks 302 that are driven in rotation. The grasping disks 302 move apart slightly and keep the egg blocked.

The rotational movement of the two adjacent grasping disks 302 makes it possible to shift the egg from bottom to top in a circular motion relative to the shaft 303.

When the egg reaches the storage box 301, the egg comes into contact with an extraction finger 306. The rotation movement of the grasping disks 302 cause the egg to slide from the bottom upwards against the protection element 306A of the extraction finger 306 and leads to its removal towards the storage box 301.

Once in the storage box 301, the egg is carried towards the bottom of the box because the bottom wall 301A is inclined.

When the storage box 301 is filled, the robot 200 can be configured to deposit the contents of the storage box 301 in a specific poultry-raising area.

If necessary, if the robot 200 has to move backwards when an egg is held blocked between two adjacent grasping disks 302, the retaining disk 305 prevents the egg from falling back to the floor.

The grasping disks 302 can be positioned parallel to the path of the robot 200. Alternatively, the grasping disks 302 may be oriented along one of more predefined angles to cover a greater egg-collecting surface.

The grasping disks 302 can be driven in rotation mechanically or electrically. Their speed as well as their sense of rotation can be regulated and be independent of the speed of advance of the robot 200.

Other Aspects and Functions

The robot 200, in addition to its poultry-educating function, fulfils one or more other functions inside the living area 110.

The robot 200 thus comprises mechanical means 250 for leveling and ventilating the floor of the living area 110, and especially the litter. The mechanical means 250 can include a rake or a harrow for example.

Indeed, the uneven features of the floor can form areas perceived as being sheltered areas by the poultry birds, which can encourage the birds to lay eggs in these sheltered areas rather than in the nests. The uneven features may be in the corners of the living area 110.

The mechanical means 250 for leveling and ventilating the floor can be:
  integrated into the robot 200 (i.e. fixed non-detachably beneath the chassis or on the rear part of the chassis);
  or again independent of the robot 200 (i.e. they're fixed reversibly to the robot so that they are detachable) and towed by the robot 200 for example.

Thus, for this towed version, the robot 200 can be used to carry different interchangeable tools and implement a system of recognition of the towed tool. This enables the robot 200 to recognize the tool that it is towing and therefore to adapt its program, such as the path and speed, according to need. For example, the system of recognition may use a contactless type implementing an RFID chip.

These mechanical means comprise means for positioning the floor leveling and ventilating tool. These positioning means, which are hand-driven or motor-driven means, comprise a shaft or a slide enabling them to pass from an active position, where they are in contact with the floor, such as the litter, to an inactive position, where they are positioned at a distance from the floor, and vice versa. The mechanical means may be positioned at a distance from the floor during a maneuver or a cycle without maintenance of the litter.

FIGS. 5A and 5B are a view in perspective and a top view of a mobile robot according to a first embodiment of the invention implementing mechanical means 250 of a first type for the leveling and ventilating the floor.

The robot 200 comprises a main chassis 201 comprising four wheels 210 mounted on the sides of the chassis 201.

The mechanical means 250 for leveling and ventilating the floor are herein towed and mounted on a secondary chassis 201' carrying a wheel 210' on each of its sides. More specifically, the secondary chassis 201' is mounted detachably through an articulated link 254 to the main chassis 201 of the robot 200.

The mechanical means 250 for leveling and ventilating the floor (i.e., the litter) herein take the form of toothed wheels 251 that are mounted with a spacing between them on a rotational shaft 252.

The rotational shaft 252 is driven rotationally at both its ends by driving means 253 comprising gear systems cooperating with a notched belt.

It can be seen that it is the movement of the wheels 210 behind the robot 200 that drive the rotational access 252 and therefore the toothed wheels 251 in rotation.

Figure 6A:
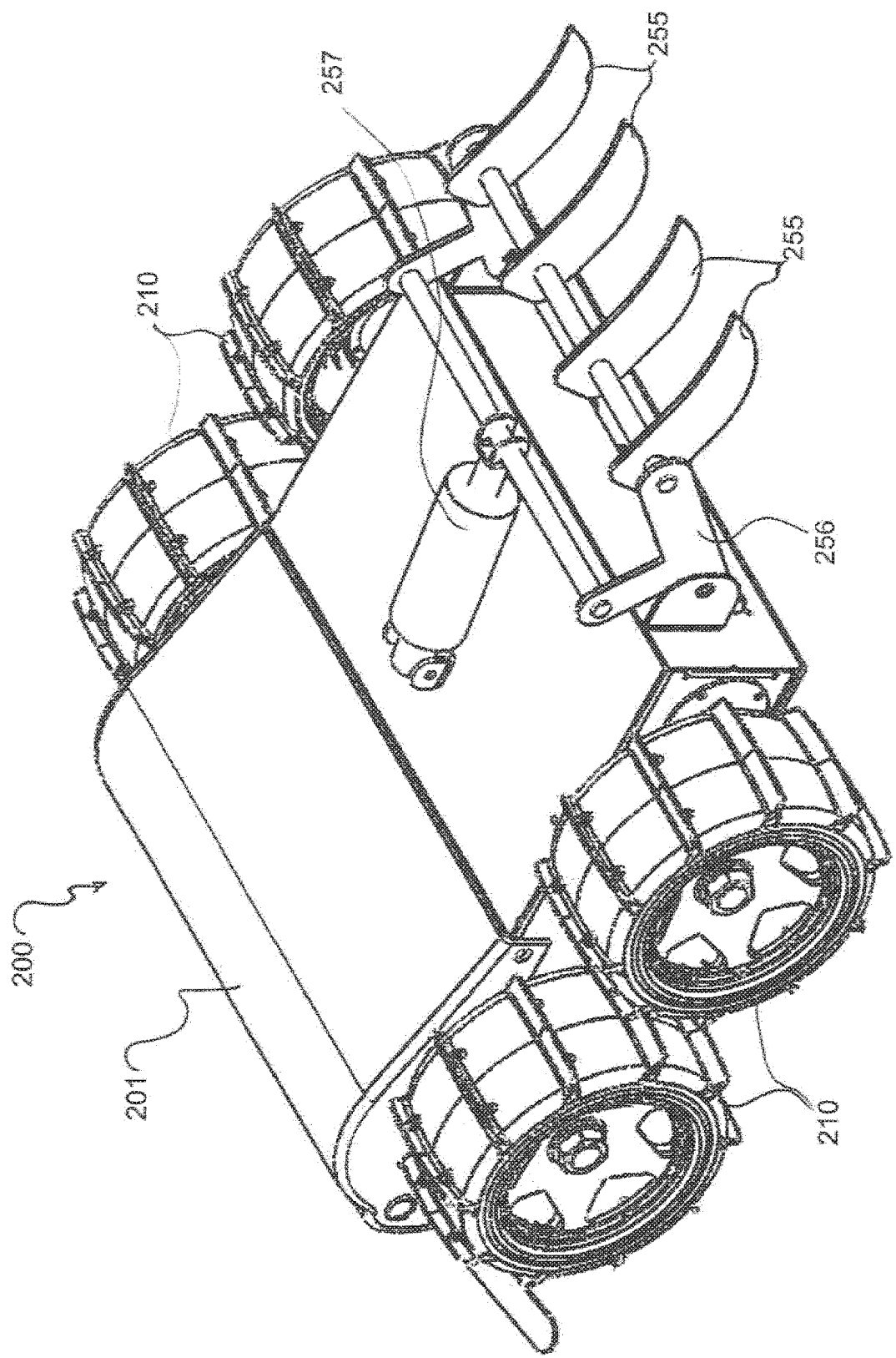
FIGS. 6A and 6B are a view in perspective and a top view of a mobile robot according to a second embodiment of the invention implementing mechanical means of a second type for leveling and ventilating the floor.
Figure 6B:
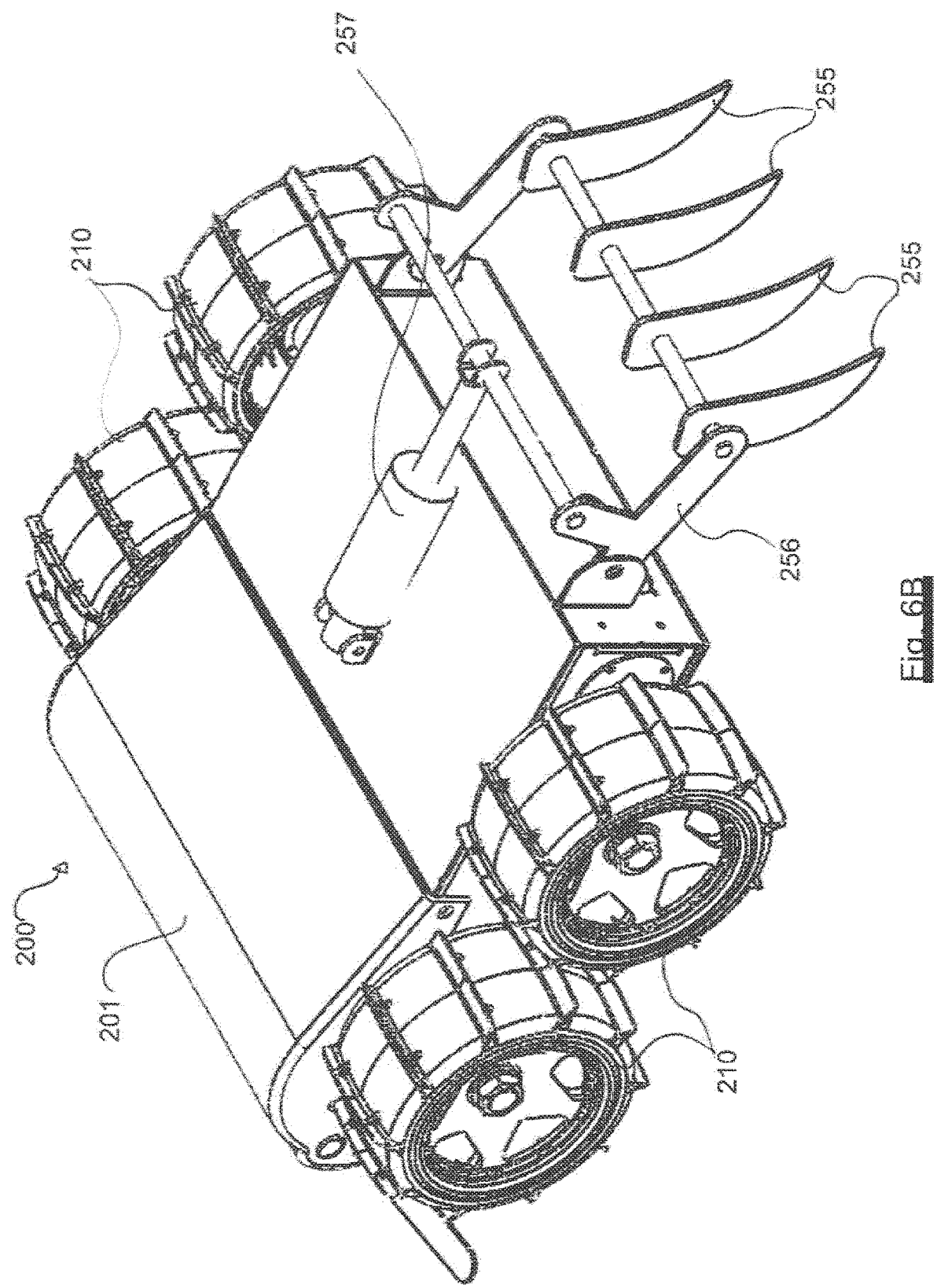

FIGS. 6A and 6B are a view in perspective and a top view of a mobile robot according to a second embodiment of the invention implementing a second type of mechanical means for leveling and ventilating the floor.

The robot 200 herein comprises a chassis 201 carrying four wheels 210 mounted on the sides of the chassis 201.

The mechanical means 250 for leveling and ventilating the floor (i.e., the litter) are herein borne by the chassis and herein take the form of teeth 255 that are mounted so as to be spaced on a support 256. This support 256 is mounted pivotingly on the chassis 201 and is actuated, manually or by motor, by means of a thruster 257 mounted on the chassis 201.

In FIG. 6A, the support 256 is in a raised (or inactive) position and in FIG. 6B the support 256 is in a "working" position, the teeth 255 being in contact with the floor.

The robot 200 can furthermore include a measurement module 240 comprising one or more measurement sensors 241 for measuring environmental parameters of the poultry house 100 and one or more measurement sensors 242 for measuring physiological parameters of the poultry birds.

The measurement sensors 241 for measuring environmental parameters are intended to measure the temperature, the pressure and humidity as well as the ammonia and carbon dioxide levels.

Advantageously, the environmental parameters are measured at the height of the robot 200, i.e. relatively close to the floor and in numerous places of the living area 110.

This gives a relatively precise, real-time mapping of different environmental parameters within the living area 110 on the basis of geolocation data delivered by the geolocation means 284.

The measuring sensors 242 for measuring the physiological parameters of the poultry birds, such as their body temperature, can include an infrared thermometer. This makes it possible to detect or confirm the presence of a dead hen for example.

The robot 200 can furthermore include an acquisition module 260 comprising a photography device 261 such as a video camera or a photographic camera and a microphone 262.

The visual and sound information collected makes it possible to detect any anomalies in the poultry house 100 and in the behavior of the poultry birds. They make it possible to detect the presence of dead poultry birds and/or floor eggs.

The parameters measured by the measurement module 240 and the visual and sound information collected through the acquisition module 260 can be stored in a storage memory 272 of the robot 200 and transmitted through wireless communications means 290A, situated on the robot 200, towards the wireless communications means 2906 situated in the room, and then interpreted by a human subject. The human subject may be a poultry farmer or veterinary doctor for example.

In one alternative, the parameters measured by the measurement module 240 and visual and sound information collected through the acquisition module 260 can be interpreted by processing means 270 of the robot, implementing a third microprocessor 271 and a second storage memory 272.

The third microprocessor 271 implements one or more algorithms for controlling the measuring module 240 and the acquisition module 260, and for collecting and processing the parameters measured and the visual and sound information collected. These algorithms are capable of:
- detecting anomalies in the measured parameters, for example when the measured values go out of the pre-determined ranges of values; and/or
- mapping the dead poultry birds and/or the floor eggs; and generating an alarm if an abnormal situation is detected, such as suspected epidemics or illness, malfunctioning of the poultry-raising facility, etc., that is transmitted to the room 140 and then interpreted (confirmed or denied) by a human subject.

The robot 200 can be adapted to distributing corn grains throughout its movements in the living area 110 so as to make the poultry farmer's work less tedious and ensure that the poultry birds participate in the maintenance of the floors.

Depending on the surface area of the living area 110, several robots according to the invention can be implemented in the living area so as to agitate the birds at a frequency that improves their fertility and reduces flow egg-laying.

The robot according to the invention is compact and has for example a height of 20 cm enabling it to move beneath the feeding systems, such as the food troughs, drinking troughs, etc.)

It can be used in any type of poultry farming, such as poultry birds, pullets, turkeys, geese, and ducks, indoors or outdoors.

As a variant, the robot 200 can be equipped with a night vision device such as thermal imaging camera, also called an infrared camera, in order to detect the presence of predators, if any, in the case of outdoor poultry farming. The visual information collected by night by the thermal imaging camera can be stored in the storage memory 272 and transmitted through wireless communications means 290A, situated on the robot 200, towards the wireless communications means 290B situated in the room 140. This information can be interpreted by a human subject, such as a poultry farmer or veterinary doctor for example, or else by the robot 200 using a shape recognition algorithm executed by the third microprocessor 271.

Should the robot 200 detect a predator, an alarm signal is transmitted to the poultry farmer or veterinary doctor situated in the room 140 using the communications means 290A, 290B.

In one particular embodiment, when the level of charge in the batteries 203 of the robot 200 goes below a predetermined threshold, an alarm signal is emitted and sent towards the room 140 through the communications means 290A, 290B in order to warn the poultry farmer or veterinary doctor that the batteries 203 have to be recharged.

As a variant, the guidance and navigation means 280 can be programmed to steer the robot 200 towards a recharging terminal situated in the poultry house 100 when the level of charge in the batteries goes below a pre-determined threshold. Once the batteries 203 are recharged, the robot 200 can continue on its way along the path 130.

The path 130 of robot 200 can be pre-programmed by a human subject in the processing means 270. The robot 200 follows this path 130 to the extent possible except when it detects an obstacle, mobile or fixed, that it circumvents before resuming its course along the path 130.

The human subject could modify this path 130 remotely from the room 140 using the communications means 290A, 290B.

As an alternative, the path can be modified or even entirely determined by the robot 200 itself in real time through the processing means 270, on the basis for example of visual information coming from the acquisition module 260 possibly revealing the presence of one or more poultry birds that might be static.

The robot 200 can also periodically, or upon request by a human subject, transmit a timeline of activity enabling the activity of the robot 200 to be tracked over lengthy periods, for example a day or a week.

The timeline of activity can include the details of the paths followed by the robot 200, readings of measurements from the environmental sensor 241 and physiological sensors 242, photographs of the living area 110 taken at given points in time obtained by the camera 261, the mapping of dead poultry birds and/or floor eggs, a reading of the alarm signals sent as well as a timeline of the level of charge in the batteries 203 of the robot 200.

It is possible to provide for a single microprocessor as well as a single storage memory to fulfill the function of the three microprocessors 231, 271 and 285 and the three storage memories 232, 272, 286 respectively. In this case, the signals from the sensors are addressed to the single microprocessor which, using received signals, manages, all together, the movements of the robot's wheels, the mobility-encouraging means, the measuring module and the acquisition module.

The geolocation means 284 of the robot 200 make it possible to determine the precise position of the robot 200 within the living area 110 and to make sure that the path of the robot 200 complies as precisely as possible with the programmed theoretical path. This further makes it possible, during the mapping stage, to provide a precise position of the dead poultry birds and/or of the floor eggs present and/or of the environmental parameters.

The disks 302 of the egg-collecting module 300 are preferably made of a flexible material, such as metal, possibly open-worked to limit rigidity, that may or may not be lined with plastic or elastomer, or they can be made of plastic that may or may not be lined with an elastomer.

The use of flexible materials ensures the structural integrity of the egg, and does so whatever its size.

In another embodiment of the egg-collecting module 300, the storage box 301 is situated on the front part of the module 300. In this case, the extraction fingers 306 must be placed before the disks 302.

As a variant, it is also possible to envisage equipping the egg-collecting module 300 with a sensor to determine the presence of eggs in the storage tub 301 and to determine whether it is capable of storing one or more additional eggs or whether the robot 200 must empty the storage box 301.

One or more sensors can also be planned to detect the presence of eggs in the disks and/or on the floor and/or in the storage box.

The invention claimed is:

1. A mobile teaching robot for a poultry farm comprising at least one egg-laying area, said robot comprising:
    means for moving the robot on a floor of the farm,
    means for encouraging mobility of poultry birds by forcing poultry birds present on the floor towards at least one egg-laying area, wherein said means for encouraging mobility comprises at least two distinct types to stimulate the poultry birds in different ways,
    means for controlling said means for encouraging mobility of the poultry birds, said means for controlling said means for encouraging mobility being configured to activate successively different sequences of said means for encouraging mobility to prevent a phenomenon of habituation of said poultry birds near the robot and,
    mechanical means for leveling and ventilating the floor.

2. The robot according to claim 1, wherein the robot further comprises a module for collecting floor eggs.

3. The robot according to claim 2, wherein said module for collecting floor eggs comprises a plurality of coaxially disposed disks.

4. The robot according to claim 3, wherein the disks are motor driven and said disks are designed to be situated at a distance from the floor.

5. The robot according to claim 3, wherein said module for collecting floor eggs comprises elements for guiding the eggs towards said disks.

6. The robot according to claim 3, wherein said module for collecting floor eggs comprises, between two adjacent disks, at least one finger for retaining an egg between the two disks.

7. The robot according to claim 2, wherein said module for collecting floor eggs comprises an egg storage box having an inclined bottom wall.

8. The robot according to claim 7, wherein said module for collecting floor eggs comprises, between two adjacent disks, at least one finger for extracting an egg situated between the two disks towards said storage box.

9. The robot according to claim 1, wherein said at least two distinct types of the means for encouraging mobility are chosen from a group consisting of:
    at least one sound source;
    at least one light source;
    at least one mechanical mobile element; and
    at least one electrical discharging device.

10. The robot according to claim 1, wherein the robot further comprises means for a geolocation of the robot.

11. The robot according to claim 1, wherein the robot further comprises sensors for measuring environmental parameters of said poultry farm.

12. The robot according to claim 1, wherein the robot further comprises sensors for measuring or acquiring at least one of the following:
    physiological parameters of poultry birds,
    environmental parameters of said poultry farm, or
    visual and/or sound information.

13. The robot according to claim 12, wherein the robot further comprises means for processing at least one of the measured or acquired:
    physiological parameters,
    visual information, or
    sound information,
    wherein the means for processing is configured to deliver a mapping of dead birds and/or floor eggs.

14. The robot according to claim 12, wherein the robot further comprises means for processing the measured or acquired environmental parameters measured, and wherein the means for processing is configured to deliver a mapping of environmental parameters of said poultry farm as a function of the measured or acquired environmental parameters.

15. A poultry-farming facility comprising at least one robot according to claim 1.

16. A mobile teaching robot for a poultry farm comprising at least one egg-laying area, said robot comprising:
    wheels for moving the robot on a floor of the farm,
    at least one sound source and at least one light source arranged to encourage mobility of poultry birds to force poultry birds present on the floor towards the at least one egg-laying area,
    a microprocessor for controlling said at least one sound source and at least one light source, said microprocessor being configured to activate successively different sequences of said at least one sound source and at least one light source to prevent a phenomenon of habituation of said poultry birds near the robot, and
    a rake arranged to level and ventilate the floor.

* * * * *